US011813683B2

(12) United States Patent
Sanogo et al.

(10) Patent No.: US 11,813,683 B2
(45) Date of Patent: Nov. 14, 2023

(54) SAW BLADE WITH SET CUTTING TEETH

(71) Applicant: BLACK & DECKER INC., New Britain, CT (US)

(72) Inventors: Poinon Sanogo, Enfield, CT (US); Asif Elliston, East Longmeadow, MA (US); Matthew Christopher Green, Amherst, MA (US); Douglas Fosberg, Wilbraham, MA (US); Steve Hampton, East Longmeadow, MA (US); Ashkan Sharifi, Wilbraham, MA (US); Joseph T. Novak, East Longmeadow, MA (US); Kurt Langheld, Southwick, MA (US); William B. Korb, Broad Brook, CT (US)

(73) Assignee: BLACK & DECKER INC., New Britain, CT (US)

( * ) Notice: Subject to any disclaimer, the term of this patent is extended or adjusted under 35 U.S.C. 154(b) by 246 days.

(21) Appl. No.: 16/695,672

(22) Filed: Nov. 26, 2019

(65) Prior Publication Data

US 2020/0180054 A1 Jun. 11, 2020

Related U.S. Application Data

(60) Provisional application No. 62/791,942, filed on Jan. 14, 2019, provisional application No. 62/775,445, filed on Dec. 5, 2018.

(51) Int. Cl.
*B23D 61/12* (2006.01)
(52) U.S. Cl.
CPC ......... *B23D 61/121* (2013.01); *B23D 61/122* (2013.01)

(58) Field of Classification Search
CPC ... B23D 61/121; B23D 61/122; B23D 61/128
(Continued)

(56) References Cited

U.S. PATENT DOCUMENTS 14,305 A * 2/1856 Coffin .................. B23D 61/121
83/846
468,150 A * 2/1892 Kerr
(Continued)

FOREIGN PATENT DOCUMENTS

DE         677993     7/1939
DE    3017251 A1  11/1980
(Continued)

OTHER PUBLICATIONS

Extended European Search Report dated May 7, 2020, Application No. 19213775.0.
(Continued)

*Primary Examiner* — Sean M Michalski
(74) *Attorney, Agent, or Firm* — Scott B. Markow

(57) ABSTRACT

A saw blade includes an elongated body extending along a longitudinal axis and having an elongated cutting edge. A first hard metal strip is attached to a first portion of the cutting edge and includes at least one first full hard metal cutting tooth that is set left at a first angle relative to a vertical axis of the body that is generally perpendicular to the longitudinal axis. A second hard metal strip attached to a second portion of the cutting edge and includes a second full hard metal cutting tooth that is set right at a second angle relative the vertical axis.

22 Claims, 14 Drawing Sheets

(58) Field of Classification Search
USPC .......... 83/835, 848, 849, 850, 852, 663, 697
See application file for complete search history.

(56) References Cited

U.S. PATENT DOCUMENTS

| | | | | |
|---|---|---|---|---|
| 601,947 | A * | 4/1898 | Clemson | B23D 61/121 83/852 |
| 1,369,178 | A * | 2/1921 | Lawrence | B23D 61/121 83/852 |
| 1,445,972 | A * | 2/1923 | Reed | B23D 61/122 83/845 |
| 1,566,880 | A * | 12/1925 | Kelley | B23D 61/121 83/852 |
| 1,581,019 | A * | 4/1926 | Roe | B23D 61/122 83/845 |
| 2,394,035 | A * | 2/1946 | Blum | B23D 61/122 83/838 |
| 2,958,240 | A | 11/1960 | Segal | |
| 3,631,906 | A * | 1/1972 | Forslund | A01G 3/08 144/34.6 |
| 3,645,155 | A | 2/1972 | Robinson | |
| 3,872,561 | A * | 3/1975 | Pomernacki | B23D 61/006 407/1 |
| 3,946,778 | A * | 3/1976 | Knuth | B23D 49/14 30/501 |
| 4,020,603 | A | 5/1977 | Austill | |
| 4,076,166 | A | 2/1978 | Austill | |
| 4,157,673 | A * | 6/1979 | Bruno | B23D 61/00 83/837 |
| 4,214,499 | A | 7/1980 | Ellis | |
| 4,690,024 | A | 9/1987 | Chaconas | |
| 4,784,033 | A | 11/1988 | Hayden et al. | |
| 5,306,285 | A | 4/1994 | Miller et al. | |
| 5,918,525 | A * | 7/1999 | Schramm | B23D 61/128 83/835 |
| 6,244,152 | B1 | 6/2001 | Di Nicolantonio | |
| 6,257,226 | B1 | 7/2001 | Hayden, Sr. | |
| 6,520,722 | B2 | 2/2003 | Hopper et al. | |
| 7,121,180 | B2 | 10/2006 | Shimofurutani | |
| 7,127,979 | B2 | 10/2006 | Kocher et al. | |
| 7,661,347 | B2 | 2/2010 | Nagano et al. | |
| 7,744,616 | B2 | 6/2010 | O'Donoghue | |
| 10,926,343 | B2 | 2/2021 | Rakurty et al. | |
| 2005/0025593 | A1 * | 2/2005 | Korb et al. | B23B 51/0473 408/206 |
| 2006/0207402 | A1 | 9/2006 | Davidson et al. | |
| 2009/0116913 | A1 * | 5/2009 | Xiao | B23D 77/02 408/1 R |
| 2010/0011594 | A1 * | 1/2010 | Wysk et al. | B23B 51/0406 30/345 |
| 2010/0037745 | A1 | 2/2010 | Rattunde | |
| 2011/0170967 | A1 * | 7/2011 | Novak et al. | B23B 51/0406 408/204 |
| 2014/0260882 | A1 * | 9/2014 | Elliston et al. | B23D 61/121 83/847 |
| 2015/0190871 | A1 * | 7/2015 | Dexter | B23D 61/14 83/851 |
| 2015/0328701 | A1 * | 11/2015 | Kauz | B23D 61/123 83/835 |
| 2017/0120357 | A1 * | 5/2017 | Trautner | B23D 65/00 |
| 2017/0225247 | A1 * | 8/2017 | Horne, Jr. | B23D 61/123 |
| 2017/0297124 | A1 | 10/2017 | Rakurty et al. | |
| 2018/0099341 | A1 | 4/2018 | Rakurty et al. | |

FOREIGN PATENT DOCUMENTS

| | | |
|---|---|---|
| DE | 10037809 A1 | 2/2002 |
| DE | 102012210164 A1 | 12/2013 |
| DE | 10393472 B4 | 6/2016 |
| EP | 0261504 A2 | 3/1988 |
| EP | 1269923 A2 | 1/2003 |
| EP | 2431118 B1 | 8/2018 |
| FR | 1093114 | 5/1955 |
| GB | 563601 | 8/1944 |
| GB | 840784 A | 7/1960 |
| JP | 3256612 A | 11/1991 |
| WO | 20180213413 | 11/2018 |

OTHER PUBLICATIONS

Summons to Attend Oral Proceedings, EP Application No. 19213775, dated Apr. 26, 2023, 18 pages, EPO.

* cited by examiner

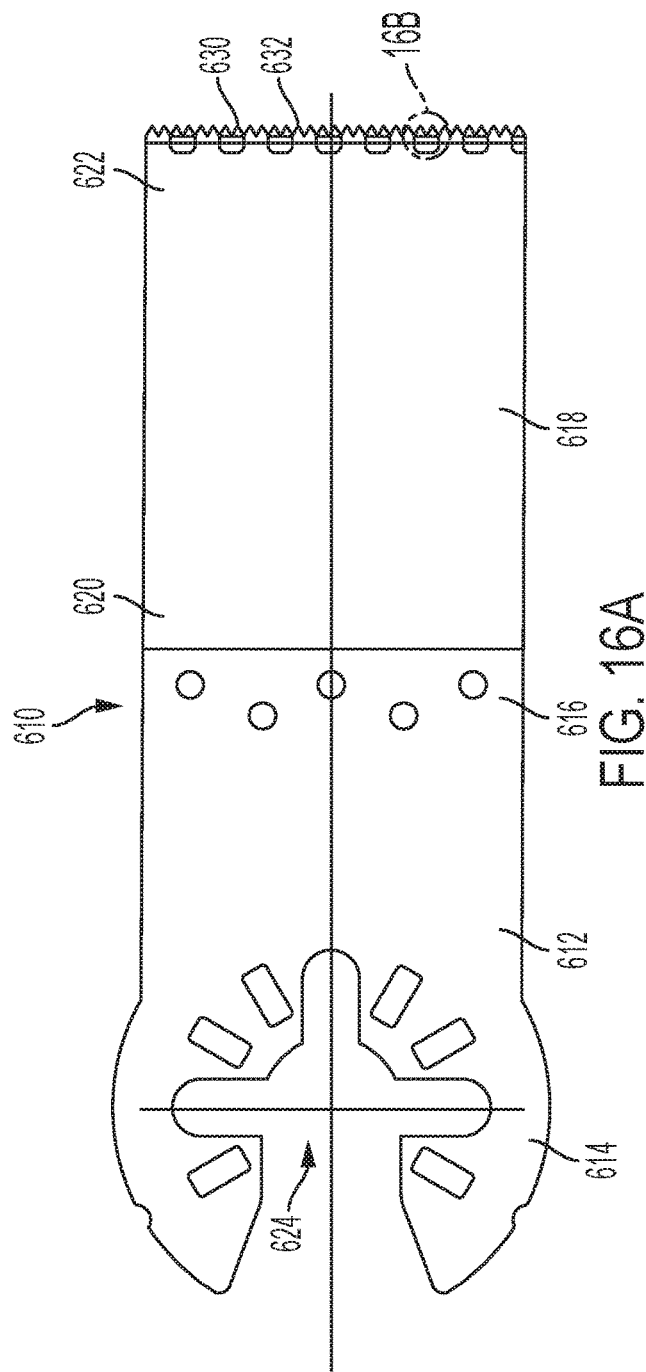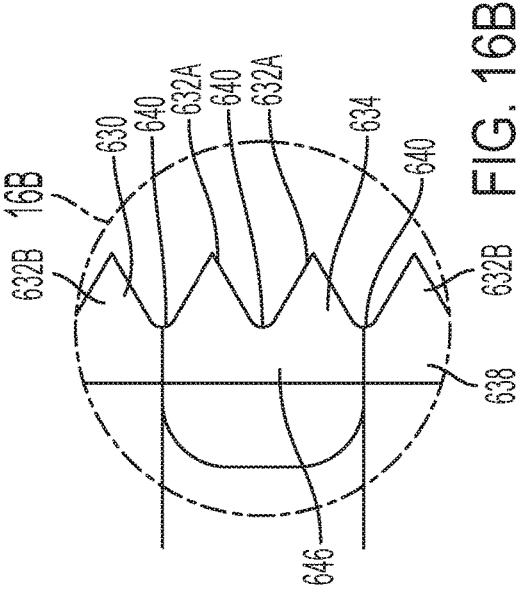

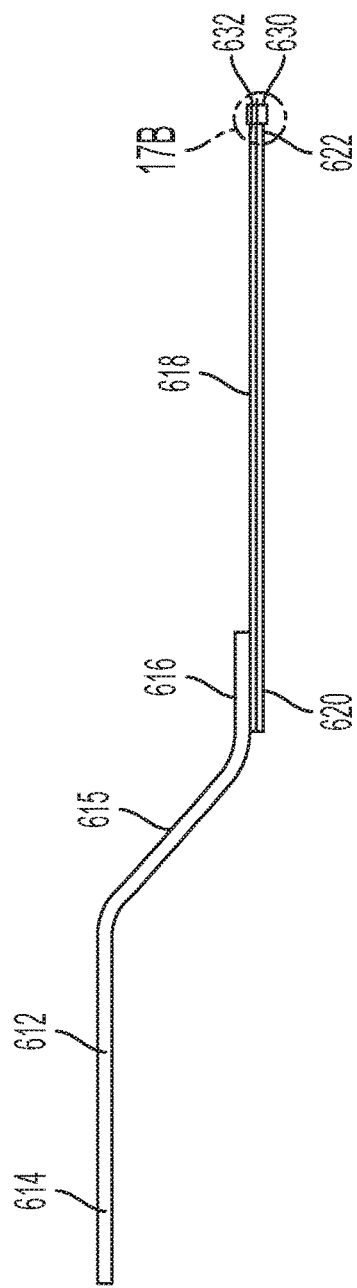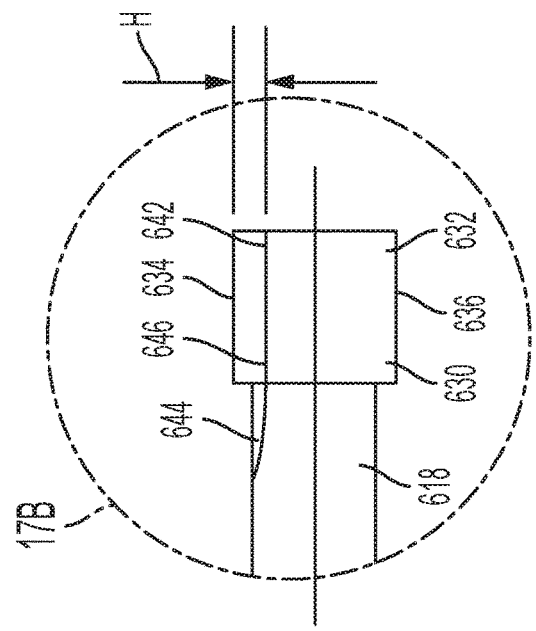
FIG. 17A
FIG. 17B

SAW BLADE WITH SET CUTTING TEETH

RELATED APPLICATIONS

This application claims priority, under 35 U.S.C § 119(e) to U.S. Provisional Patent Application No. 62/775,445, filed Dec. 5, 2018, titled "Saw Blade with Set Cutting Teeth" and to U.S. Provisional Patent Application No. 62/791,942, filed Jan. 14, 2019, titled "Saw Blade with Set Cutting Teeth," each of which is incorporated by reference.

TECHNICAL FIELD

This application relates to saw blades (e.g., linear edge saw blades such as reciprocating saw blades, jigsaw blades, bandsaw blades, and holesaws) with set cutting teeth (e.g., set hard metal cutting teeth).

BACKGROUND

A linear edge saw blade (e.g., reciprocating saw blades, jigsaw blades, bandsaw blades, and holesaws) generally has an elongated body with an elongated cutting edge having a plurality of cutting teeth. At least some of the teeth may be set to the left and right in a repeating pattern (e.g., unset or raker, left set, right set). Setting the teeth in this manner may improve cutting performance and/or life of a reciprocating saw blade by creating a wider kerf when cutting a workpiece.

Linear edge saw blades for cutting metal or other hard or abrasive workpieces may include hard metal (e.g., carbide) cutting tips or inserts that are welded, brazed, or otherwise affixed to the tips of the cutting teeth or tooth holders of the saw blade (see, for example, US Pat. App. Pub. No. 2013/0333541). At least some of the teeth that hold the hard metal cutting tips may be set left or right. However, it is impractical to attach hard metal cutting inserts or tips to such a saw blade having a fine pitch (e.g., a pitch finer than or equal to 12 teeth per inch (tpi) (i.e., having greater than or equal to 12 tpi)) because the tips or inserts are too small to effectively weld, braze, or otherwise attach them to the teeth of the saw blade body.

Linear edge saw blades for cutting metal or other hard or abrasive workpieces may alternatively include a body with a strip or multiple strips of hard metal (e.g., carbide) each having a plurality of full teeth (as opposed to hard metal cutting tips), with the strips welded, brazed, or otherwise attached to a softer metal body that has no cutting teeth (see, for example, GB Patent Specification No. GB840,784 and German Patent Publication No. DE323622). In these designs, the strips generally have a length of 1.5 inches or more and the teeth are unset and generally have a trapezoidal cross-section when viewed from the rake face of the tooth. Setting these types of hard metal strips with full cutting teeth is difficult for several reasons. First, because of the length of these strips, they tend to have a large number of teeth per strip, and attempting to set teeth on a single carbide strip in different directions is extremely difficult and tends to cause fracturing of the teeth or carbide strip. Also, even if all the teeth in a strip are set the same direction, this setting operation tends to cause weakness in the joint used to attach the carbide strips to the blade body and/or causes the carbide teeth to be damaged while being set due to the high hardness and poor fracture toughness of the carbide.

SUMMARY

In an aspect, a saw blade includes an elongated body extending along a longitudinal axis and having an elongated cutting edge. A first hard metal strip is attached to a first portion of the cutting edge and includes at least one first full hard metal cutting tooth that is set left at a first angle relative to a vertical axis of the body that is generally perpendicular to the longitudinal axis. A second hard metal strip attached to a second portion of the cutting edge and includes a second full hard metal cutting tooth that is set right at a second angle relative the vertical axis.

Implementations of this aspect may include one or more of the following. The at least one first hard metal cutting tooth may include at least two first full hard metal cutting teeth. The at least one second hard metal cutting tooth may include at least two second full hard metal cutting teeth. The first hard metal strip may be attached to the first portion of the cutting edge by welding with a first weld fusion zone composed of a ductile material. The at least one first full hard metal cutting tooth may be set left by applying a lateral force to bend the first weld fusion zone. The second hard metal strip may be attached to the first portion of the cutting edge by welding with a second weld fusion zone composed of a ductile material. The at least one second full hard metal cutting tooth may be set right by applying a lateral force to bend the second weld fusion zone. The at least one first tooth may be set left by forming a left side face of the at least one tooth to be angled away from the vertical axis.

A right side face of the at least one first tooth may be formed to be angled relative to the vertical axis at an angle that is substantially the same as the first angle, so that the at least one first tooth has the shape of a parallelogram. The at least one second tooth may be set right by forming a right side face of the at least one tooth to be angled away from the vertical axis by the second angle. A left side face of the at least one second tooth may be formed to be angled relative to the vertical axis at an angle that is substantially the same as the second angle, so that the at least one second tooth has the shape of a parallelogram. A third hard metal strip may be affixed to a third portion of the cutting edge and including at least one third full hard metal cutting tooth that is unset. The first hard metal strip may further include a first base portion integral with the at least one first hard metal cutting tooth, the first base portion attached to first portion of the cutting edge. The second hard metal strip may further include a second base portion integral with the at least one second hard metal cutting tooth, the second base portion attached to second portion of the cutting edge. The at least one first hard metal cutting tooth may include at least two first hard metal cutting teeth and at least one first full gullet between the at least two first hard metal cutting teeth. The at least one second hard metal cutting tooth may include at least two second hard metal cutting teeth and at least one second full gullet between the at least two second hard metal cutting teeth. A space may be between the first hard metal strip and the second hard metal strip within a gullet. The saw blade may be formed as one of a reciprocating saw blade, a jigsaw blade, a holesaw, an oscillating blade, and a bandsaw blade.

In another aspect, a method of manufacturing a saw blade includes: providing an elongated body extending along a longitudinal axis and having an elongated cutting edge; attaching a first hard metal strip to a first portion of the cutting edge, the first hard metal strip including at least one first full hard metal cutting tooth; attaching a second hard metal strip to a second portion of the cutting edge, the second hard metal strip including at least one second full hard metal cutting tooth; causing the at least one first full hard metal cutting tooth to be set left at a first angle relative to a vertical axis of the body that is perpendicular to the longitudinal axis; and causing the at least one second full hard metal cutting tooth to be set right at a second angle relative to the vertical axis.

Implementations of this aspect may include one or more of the following features. The at least one first hard metal cutting tooth may include at least two first full hard metal cutting teeth. The at least one second hard metal cutting tooth may include at least two second full hard metal cutting teeth. Attaching the first hard metal strip to the body may include welding the first hard metal strip to the cutting edge with a first weld fusion zone composed of a ductile material. Causing the at least one first full hard metal cutting tooth to be set left comprises applying a lateral force to bend the first weld fusion zone. Attaching the second hard metal strip to the body may include welding the second hard metal strip to the cutting edge with a second weld fusion zone composed of a ductile material. Causing the at least one second full hard metal cutting tooth to be set right comprises applying a lateral force to bend the second weld fusion zone. Causing the at least one first tooth to be set left may include forming a left side face of the at least one tooth to be angled away from the vertical axis at the first angle. Causing the at least one first tooth to be set left may include forming a right side face of the at least one tooth to be angled relative to the vertical axis at an angle that is substantially the same as the first angle, so that the at least one first tooth has the shape of a parallelogram. Causing the at least one second tooth to be set right may include forming a right side face of the at least one tooth to be angled away from the vertical axis by the second angle. Causing the at least one second tooth to be set right may include forming a left side face of the at least one tooth to be angled relative to the vertical axis at an angle that is substantially the same as the second angle, so that the at least one second tooth has the shape of a parallelogram.

A third hard metal strip may be attached to a third portion of the cutting edge, the third hard metal strip including at least one third full hard metal cutting tooth that is unset. The first hard metal strip may further include a first base portion coupled to the at least one first hard metal cutting tooth, and attaching the first hard metal strip to the first portion of the cutting edge may include attaching the first base portion to the cutting edge. The second hard metal strip may further include a second base portion coupled to the at least one second hard metal cutting tooth, and attaching the second hard metal strip to the second portion of the cutting edge may include attaching the second base portion to the cutting edge. The at least one first hard metal cutting tooth may be formed to include at least two first hard metal cutting teeth with at least one first full gullet between the at least two first hard metal cutting teeth. The at least one second hard metal cutting tooth may be formed to include at least two second hard metal cutting teeth with at least one second full gullet between the at least two second hard metal cutting teeth. A space may be left between the first hard metal strip and the second hard metal strip to serve as a gullet. The saw blade may be formed into one of a reciprocating saw blade, a jigsaw blade, a holesaw, an oscillating blade, and a bandsaw blade.

In another aspect, a saw blade includes an elongated body having an elongated cutting edge, a left side face, and a right side face. A hard metal strip may have a base portion affixed to the cutting edge, at least one first full hard metal cutting tooth attached to the base portion, and at least one second full hard metal cutting tooth attached to the base portion, each cutting tooth having a left side surface and a right side surface. The right side surface of each first cutting tooth may define a first recess in the first cutting tooth, such that each first cutting tooth is set left. The left side surface of each second cutting tooth may define a second recess in the second cutting tooth, such that each second cutting tooth is set right.

Implementations of this aspect may include one or more of the following features. Each first recess may extend into the right side face of the body. Each second recess may extend into the left side face of the body. The right side surface of each first cutting tooth may be parallel to the right side face of the body. The left side surface of each second cutting tooth may be parallel to the left side face of the body. The left side surface of each first cutting tooth may extend at an angle away from the left side surface of the body. The right side surface of each second cutting tooth may extend at an angle away from the right side surface of the body. The hard metal strip may further include at least one third hard metal tooth attached to the base portion and being free of any recess, such that the third hard metal tooth is unset. The left side surface of each third cutting tooth may extend at an angle away from the left side surface of the body and the right side surface of each second cutting tooth may extend at an angle away from the right side surface of the body. Each first recess may be formed by grinding the right side surface of each first tooth after the hard metal strip has been attached to the body. Each second recess may be formed by grinding the left side surface of each second tooth after the hard metal strip has been attached to the body. The saw blade may be formed as one of a reciprocating saw blade, a jigsaw blade, a holesaw, and a bandsaw blade.

In another aspect, a method of forming a saw blade may include providing an elongated body having an elongated cutting edge, a left side face, and a right side face; affixing a base portion of a hard metal strip to the cutting edge, the hard metal strip having at least one first full hard metal cutting tooth attached to the base portion and at least one second full hard metal cutting tooth attached to the base portion, each cutting tooth having a left side surface and a right side surface; forming a first recess in the right side surface of each first cutting tooth, such that each first cutting tooth is set left; and forming a second recess in the left side surface of each second cutting tooth, such that each second cutting tooth is set right.

Implementations of this aspect may include one or more of the following features. The first recess may be extended into the right side face of the body. The second recess may be extended into the left side face of the body. After forming each first recess, the right side surface of each first cutting tooth may be parallel to the right side face of the body. After forming each second recess, the left side surface of each second cutting tooth may be parallel to the left side face of the body. After forming each first recess, the left side surface of each first cutting tooth may extend at an angle away from the left side surface of the body. After forming each second recess, the right side surface of each second cutting tooth may extend at an angle away from the right side surface of the body. The hard metal strip may further include at least one third hard metal tooth attached to the base portion and free of any recess, such that the third hard metal tooth is unset. The left side surface of each third cutting tooth may extend at an angle away from the left side surface of the body and the right side surface of each second cutting tooth may extend at an angle away from the right side surface of the body. Forming each first recess may include grinding the right side surface of each first tooth after the hard metal strip has been attached to the body. Forming each second recess may include grinding the left side surface of each second tooth after the hard metal strip has been attached to the body.

The saw blade may be formed into one of a reciprocating saw blade, a jigsaw blade, a holesaw, an oscillating blade, and a bandsaw blade.

Advantages may include one or more of the following. The set carbide teeth of the present disclosure provide for a significantly longer life and improved cutting performance as compared to bi-metal blades having a similar tooth pitch. The carbide teeth of the present disclosure having full carbide teeth on fine pitch saw blades, instead of carbide inserts on coarse pitch saw blades, are technically feasible to manufacture and have better cutting performance and life. In addition, the saw blades according to this disclosure allow for mixing of carbide grade in the various carbide segments in order to obtain improved cutting life and performance when cutting a wide variety of workpiece materials. For example, certain carbide grades perform best cutting extremely hard objects like cast iron pipe, while other carbide grades excel at cutting stainless steel workpieces, and yet other carbide grades are best for cutting carbon steel. The carbide saw blade of this invention could be made so that the carbide grades are blended to get the highest level of performance and versatility when used in a wide variety of cutting applications. These and other advantages and features will be apparent from the description, the drawings, and the claims.

BRIEF DESCRIPTION OF THE DRAWINGS

FIG. 16A is a top view of another embodiment of an oscillating blade.

FIG. 16B is a close-up view of the circled portion 16B in FIG. 16A.

FIG. 17A is a side view of the oscillating blade of FIG. 16A.

FIG. 17B is a close-up view of the circled portion 17B in FIG. 17A.

DETAILED DESCRIPTION

Figure 1:
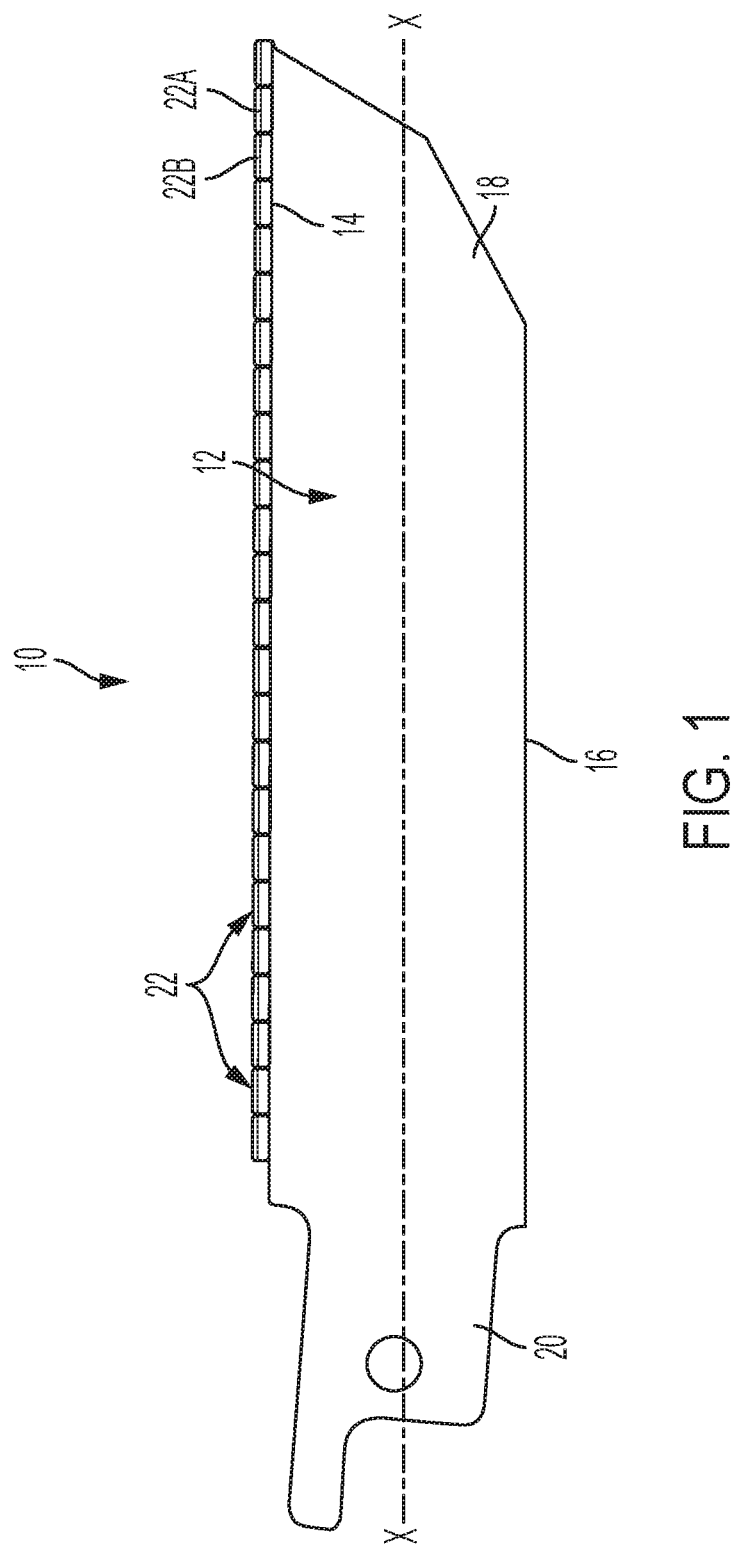
FIG. 1 is a side view of an embodiment of a saw blade.
Figure 2:
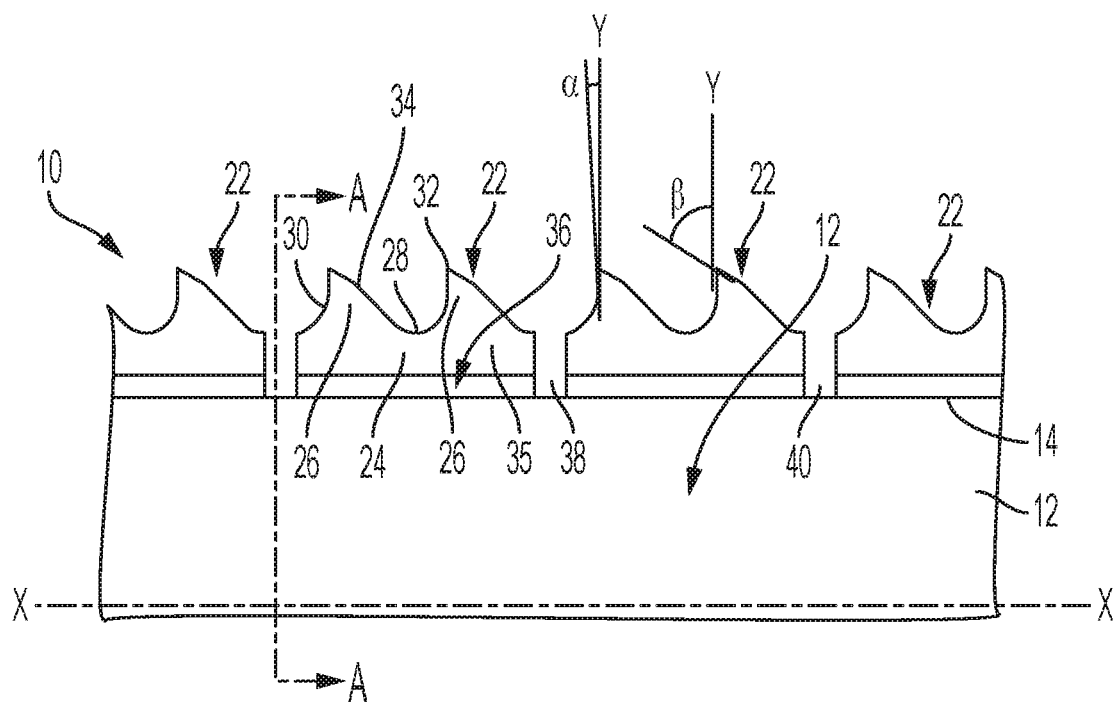
FIG. 2 is a close-up side view of a portion of the saw blade of FIG. 1.
Figure 3:
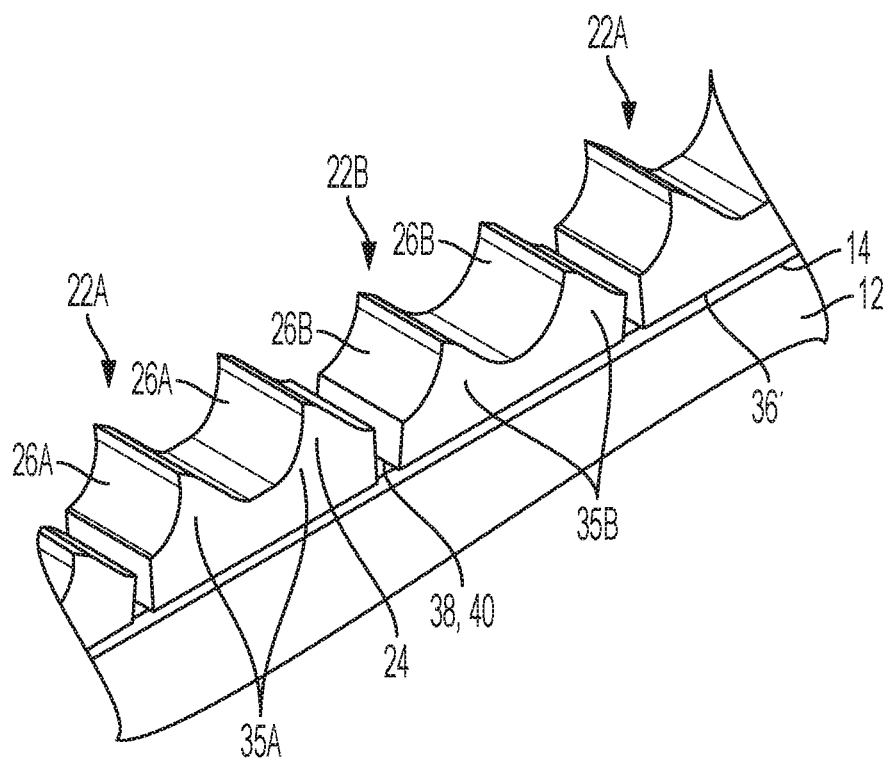
FIG. 3 is a close-up perspective view of an implementation of the saw blade of FIG. 1.

Referring to FIGS. 1-3, in an embodiment, a saw blade 10 (e.g., a reciprocating saw blade) includes an elongated body 12 having an elongated cutting edge 14, an elongated back edge 16, a distal tip portion 18, and a proximal tang 20 configured to couple the reciprocating saw blade to a powered reciprocating saw. The body 12 may be composed of a metal material such as mild steel (e.g., carbon steel). A plurality of cutting strips 22 configured to perform cutting of a workpiece are attached to the cutting edge 14 of the body 12.

Each cutting strip 22 is composed of a hard metal material to facilitate cutting metal materials, such as pipes or electrical conduits. The hard metal material may be composed of a hard metal, such as carbide (e.g., tungsten carbide) or cermet, that is harder than the metal material of the body 12. It is desirable to select a grade of hard metal material that has a high amount of toughness and impact resistance. A carbide that lacks good toughness will typically fail by chippage, strippage or carbide fracturing. Moreover, the carbides on prior art carbide blades consist of long extruded carbide strip or strips having a length of 1.5 inches or more and a trapezoidal cross-section attached to the backing steel blade body. Full cutting teeth are ground, pressed, molded, or otherwise formed in the carbide strips prior to them being attached to the body 12, which creates a simple design with low manufacturing complexity and cost.

Each hard metal cutting strip 22 includes a base portion 24 and a plurality of full cutting teeth 26A, 26B that are integral with the base portion 24. In the illustrated embodiment, each hard metal cutting strip 22 comprises at least two cutting teeth 26A that will be set left, at least two teeth 26B that will be set right (e.g., by approximately 0.005 inches to approximately 0.025 inches), and intermediate gullets 28 disposed between adjacent teeth 26A, 26B. Using strips 22 having a plurality of full hard metal cutting teeth 26 enables the hard metal teeth to be arranged with at a fine tooth pitch (e.g., a pitch finer than or equal to 12 tpi (i.e., having greater than or equal to 12 tpi)), since a plurality of full teeth connected by a baserse can be welded more easily to the body 12. It should be understood that each strip 22 may include only one or more cutting teeth and may be formed without any base portion beneath the cutting teeth. In addition, each strip 122 may include a fewer or a greater number of full cutting teeth 26A, 26B.

Each full cutting tooth 26A, 26B includes a rake face 30 extending upward from the base portion 24 to a cutting tip 32, and a relief face 34 extending downward from the cutting tip 30 to the base portion 28. Each rake face 30 is disposed at a rake angle α (e.g., approximately −10° to 10°) relative to a vertical axis Y that is perpendicular to the longitudinal axis X. Each relief face 34 is disposed at a relief angle β (e.g., approximately 5° to 45°) relative to the vertical axis Y. Each cutting tooth 26 also has a left side face 37 and a right side face 35 extending from the rake face 30 to the relief face 34.

Each hard metal strip 22 is attached to the cutting edge 14 of the body 12, e.g., by welding, brazing, soldering, or adhesive. In one embodiment, the base portion 24 of each hard metal strip 22 is welded to the cutting edge 14 via a more ductile weld fusion zone 36. Each weld fusion zone 36 may be composed of an alloying material that results in a more ductile welded joint. For example, an alloying material such as nickel or a nickel alloy may be sandwiched between the strip 22 and blade body 12 or fed into the weld zone between the strip 22 and the blade body 12. This blended composition of the resulting weld joint results in a ductile material that enables stronger plastic deformation of the weld zone during a setting operation. Without the additional ductility, the weld seam would crack, and the set carbide strips and teeth would be prone to fracturing, chipping, or breaking off during the setting process or use of the saw blade.

Alternatively, as shown in FIG. 3, the cutting edge 14 may have one or more elongated weld fusion zones 36' to which the base portions 24 of a plurality of the hard metal strips 22 is attached. The hard metal strips 22 are attached with a space 38 disposed between each adjacent strip 22, within a gullet 40 between the teeth 26 on adjacent strips 22.

Figure 4:
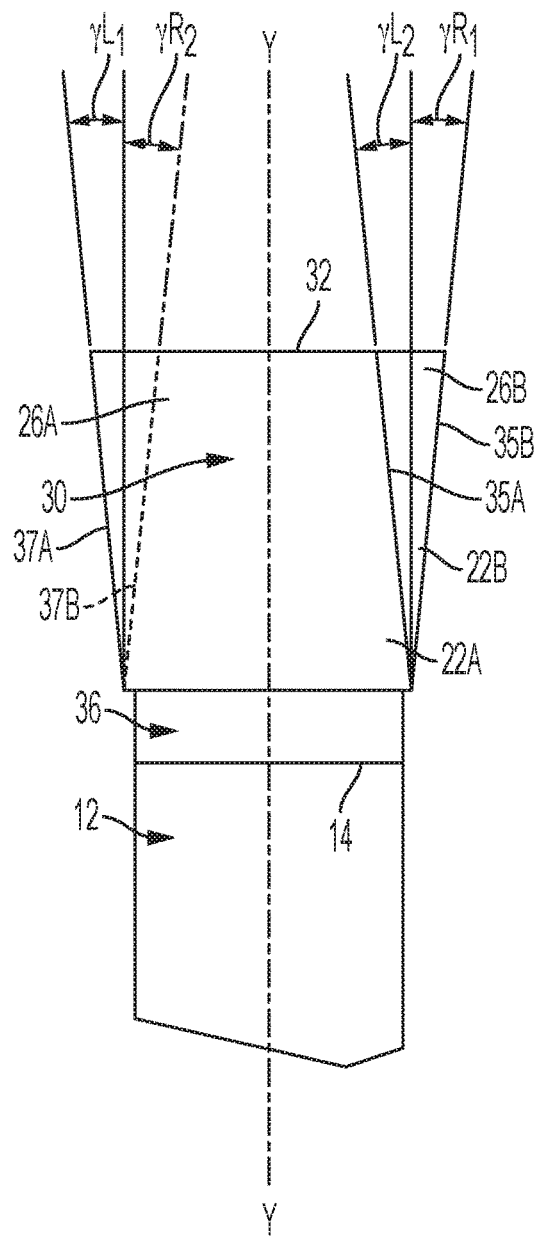
FIG. 4 is a close-up cross-sectional view of the implementation of the saw blade of FIG. 3 along line A-A in FIG. 2.

Because they are made of a hard metal, the teeth 26 on the strips 22 cannot be set left or right in the traditional manner by bending the teeth because this would require a great deal of force and risk fracturing the strips 22. Instead, in an embodiment illustrated in FIGS. 3 and 4, left and right side faces 37A, 35A of teeth 26A on a first hard metal strip 22A may be ground or otherwise formed or shaped (either before or after being attached to the body 12) so that the left side face 37A is at a first left angle γL1 (e.g., approximately 2° to 10°) and the right side face 35A is a at a second left angle γL2 (e.g., approximately 0° to 20°) relative to the vertical axis Y of the body 12. The first and second left angles γL1, γL2 may be equal so that, when viewed from the rake face 30, the first teeth 26A have a parallelogram appearance. Alternatively, the first and second left angles γL1, γL2 may be different.

Similarly, left and right side faces 37B, 35B of teeth 26B on a second hard metal strip 22B that is adjacent to the first hard metal strip 22A may be ground or otherwise formed or shaped (either before or after being attached to the body 12) so that the right side face 35B is at a first right angle γR1 (e.g., approximately 2° to 10°) and the left side face 37A is at a second right angle γR2 (e.g., approximately 0° to 20°) relative to the vertical axis Y of the body 12. The first and second right angles γR1, γR2 may be equal so that, when viewed from the rake face 30, the second teeth 26A have a parallelogram appearance. Alternatively, the first and second right angles γR1, γR2 may be different.

The first and second left angles γL1, γL2 of the side faces 37A, 35A of the first teeth 26A on the first strip 22A effectively cause the first teeth 26A to perform as though they are set to the left. The first and second right angles γR1, γR2 of the side faces 35B, 37B of the second teeth 26B on the first strip 22B effectively cause the first teeth 26B to perform as though they are set to the right. For example, in the illustrated embodiment, the strips 22A, 22B, each having two teeth 26A, 26B, are set in a L-R-L-R- pattern so that two consecutive teeth 26A are set left followed by two consecutive teeth 26B set right. Alternatively, there may be a third strip in each sequence in which the side faces are not ground or are formed generally parallel to the vertical axis Y, such that the teeth on the third strip perform as though they are unset or raker teeth. In that embodiment, the strips 22 could be set in a L-R-U-L-R-U- pattern. Other set patterns may be used, such as light left-light right-heavy left-heavy right- or unset-left-right-left-right-. The set angles of the left set teeth and the right set teeth may be the same or may be different.

Figure 5:
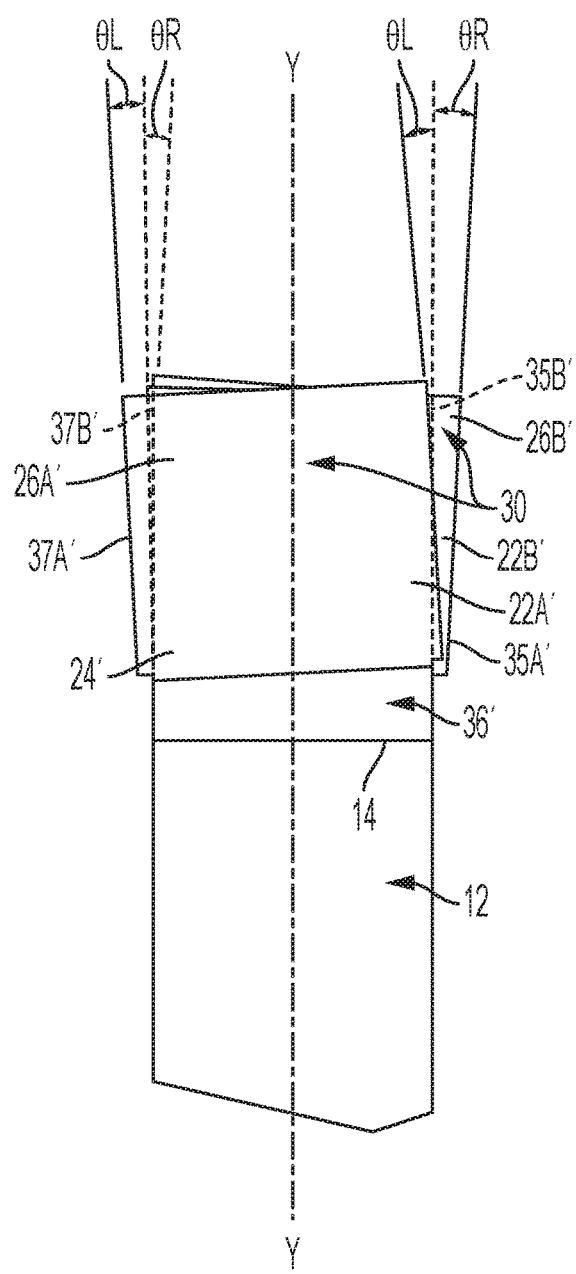
FIG. 5 is a close-up cross-sectional view of another implementation of the saw blade of FIG. 2 along line A-A in FIG. 2.
Figure 6:
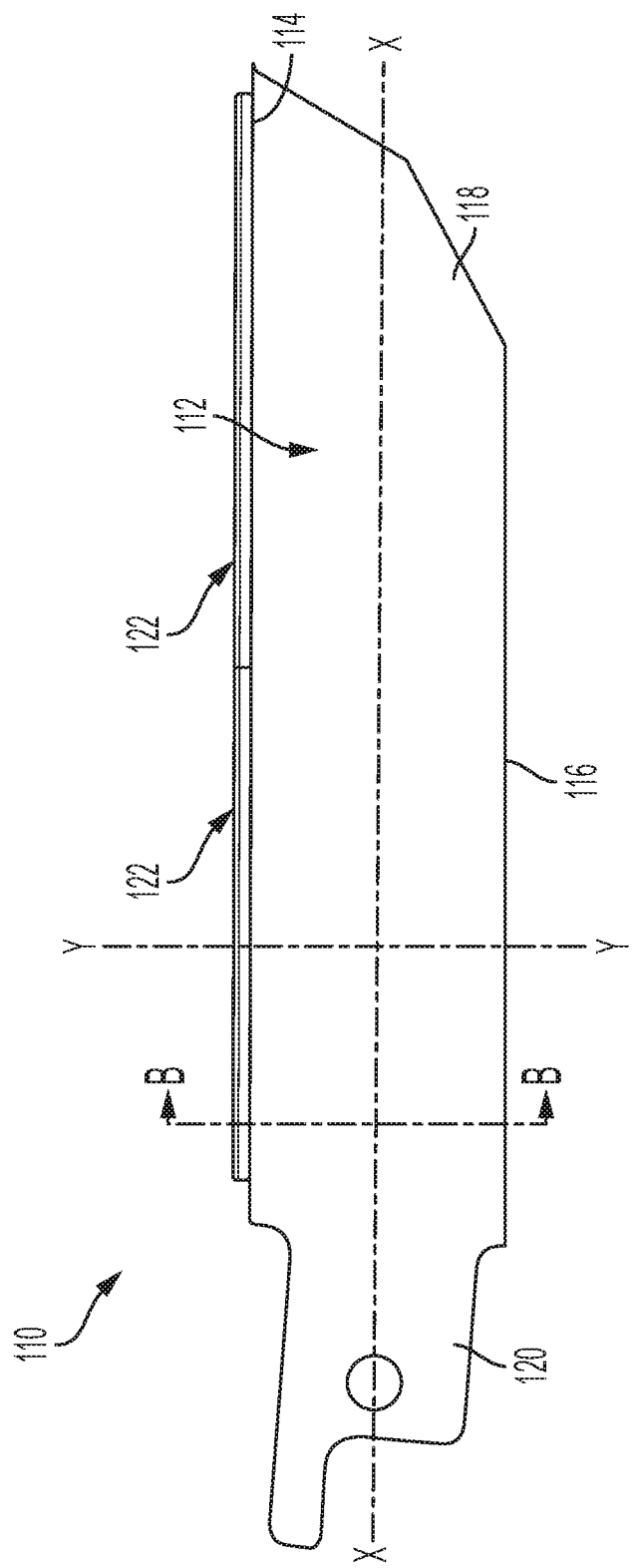
FIG. 6 is a side view of another embodiment of a saw blade.

Referring also to FIG. 5, in another embodiment, left and right side faces 37A', 35A' of teeth 26A' on a first hard metal strip 22A' may be ground or otherwise formed or shaped (either before or after being attached to the body 12) so that the left side face 37A' and the right side face 35A' are parallel to the vertical axis Y of the body 12. Similarly, left and right side faces 37B', 35B' of teeth 26B' on a second hard metal strip 22B' that is adjacent to the first hard metal strip 22A' may be ground or otherwise formed or shaped (either before or after being attached to the body 12) so that the right side face 35B' and the left side face 37A are parallel to the vertical axis Y of the body 12. Alternatively, the first and second left and right side faces 37A', 37B', 35A', 35B' may be ground or formed so that one or more of them is at an angle to the vertical axis Y and are the same or different than one another, e.g., to form a parallelogram or trapezoid shape.

The strips 22A', 22B' of FIG. 5 are attached to the cutting edge 14 of the body 12, e.g., by welding, brazing, soldering, or adhesive. For example, in the illustrated embodiment, the base portion 24' of each hard metal strip 22A', 22B' is attached to the cutting edge 14 of the body 12 by welding via one or more weld fusion zones 36'. As shown in FIG. 5, after the strips 22A', 22B' are attached to the body, an entirety of a first hard metal strip 22A' may be set left at a left set angle ΘL (e.g., approximately 1° to 10°) relative to the vertical axis Y of the body 12, and an entirety of a second hard metal strip 22B' may be set right at a right set angle ΘR (e.g., approximately 1° to 10°) relative to the vertical axis Y of the body 12. Thus, the teeth 26A' on the first strip 22A' are set left, and the teeth 26B' on the second strip 22B' are set right. As illustrated in FIG. 5, if the left and right side faces 37A', 35A' of the teeth 26A' on the first strip 22A' are originally parallel to the vertical axis Y, then after setting they are at the left set angle ΘL relative to the vertical axis Y. If the left and right side faces 37B', 35B' of the teeth 36B' on the second strip 22B' are originally parallel to the vertical axis Y, then after setting they are at the right set angle ΘR relative to the vertical axis Y. This setting operation may be performed by applying lateral forces to the strips 22A', 22B' to bend their weld fusion zones 36', as shown in FIG. 5. Alternatively, a portion of the body 12 may be bent to set the teeth 26A', 26B' on the strips 22A', 22B' left and right, respectively.

In the illustrated embodiment, the strips 22A', 22B', each having two teeth 26A', 26B', are set in a L-R-L-R- pattern so that two consecutive teeth 26A' are set left followed by two consecutive teeth 26B' set right. Alternatively, there may be a third strip in each sequence in which the side faces are formed generally parallel to the vertical axis Y and is not set left or right, such that the teeth on the third strip are unset or raker teeth. In that embodiment, the strips could be set in a L-R-U-L-R-U- pattern. Other set patterns may be used, such as light left-light right-heavy left-heavy right- or unset-left-right-left-right-. In each embodiment, the set angles of the left set teeth and the right set teeth, and the angles of the side faces of the left and right set teeth, may be the same or may be different than one another.

In an experiment, saw blades having carbide strips attached to the blade body by a ductile weld fusion zone (e.g., containing a 0.005 inch nickel shim), according to the embodiment of FIG. 2, and set according to the embodiment of FIG. 5, were compared to saw blades having carbide strips attached to the blade body by a conventional weld and set similarly to the strips in the embodiment of FIG. 5. Each design was tested by applying a lateral force to the carbide strip and determining the force at which the joint between the carbide strip and the blade body would fracture. As shown by the data in Table 1, below, in blades using a conventional weld joint, the carbide broke cleanly at the weld with virtually no deformation in the weld (preventing setting of the teeth), with an average breaking force of about 240 pounds of force (lbf). As shown by the data in Table 2 below, in blades having the more ductile nickel weld fusion zones of FIGS. 2 and 5, the weld would begin to bend (enabling setting of the teeth) at an average force of 140 lbf. The weld continued to bend until it fractured when an average force of 304 lbf was reached. Thus, the more ductile nickel welds exhibited two surprising and desirable traits. First, the carbide was able to be pushed over neatly just like the set of a tooth of an ordinary saw blade. Second, the strength of the weld after setting was higher than a traditional weld, even as compared to traditionally welded strips that are not set.

TABLE 1

Saw Blades with Carbide Strips Attached by Conventional Weld

| Sample | Lateral Force At Fracture (lbf) | Notes |
|---|---|---|
| 1 | 240 | Clean Break |
| 2 | 238 | Clean Break |
| 3 | 237 | Clean Break |
| 4 | 243 | Partial Break |
| Avg. | 240 | |

TABLE 2

Saw Blades with Carbide Strips Attached By Ductile Weld Fusion Zone Containing Nickel

| Sample | Lateral Force At Bend in Weld Fusion zone (lbf) | Lateral Force at Fracture (lbf) | Notes |
|---|---|---|---|
| 1 | 124 | 296 | Carbide strip pushed over smoothly until break |
| 2 | 117 | 246 | Carbide strip pushed over smoothly until break |
| 3 | 118 | 222 | Carbide strip pushed over smoothly until break |
| 4 | 161 | 416 | Carbide strip pushed over smoothly until break |
| Avg. | 140 | 304 | |

Referring to FIGS. 6-11, in another embodiment, a saw blade 110 (e.g., a reciprocating saw blade) includes an elongated body 112 having an elongated cutting edge 114, an elongated back edge 116, a distal tip portion 118, and a proximal tang 120 configured to couple the reciprocating saw blade to a powered reciprocating saw. The body 112 may be composed of a metal material such as high strength steel (e.g., medium-carbon steel, having a hardness between Rc30 and Rc60). One or more cutting strips 122 configured to perform cutting of a workpiece are attached to the cutting edge 114 of the body 112.

Each cutting strip 122 is composed of a hard metal material to facilitate cutting metal materials, such as pipes or electrical conduits. The hard metal material may be composed of a hard metal, such as carbide (e.g., tungsten carbide) or cermet, that is harder than the metal material of the body 112. It is desirable to select a grade of hard metal material that has a high amount of toughness and impact resistance. A carbide that lacks good toughness will typically fail by chippage, strippage or carbide fracturing. Full cutting teeth are ground, pressed, molded, or otherwise formed in the carbide strip prior to the strips being attached to the body 112, which creates a simple design with low manufacturing complexity and cost.

Each hard metal cutting strip 122 includes a base portion 124 and a plurality of full cutting teeth 126A, 126B that are integral with the base portion 124. In the illustrated embodiment, each hard metal cutting strip 122 comprises at least two cutting teeth 126A to be set left, at least two cutting teeth 126B to be set right, and intermediate gullets 128 disposed between adjacent teeth 126A, 126B. Using strips 122 having a plurality of full hard metal cutting teeth 126 enables hard metal teeth to be arranged with at a fine tooth pitch (e.g., a pitch finer than or equal to 12 tpi (i.e., having greater than or equal to 12 tpi)), since a base 124 supporting a plurality of teeth 126A, 126B can be welded more easily to the body 112. It should be understood that each strip 122 may include one or more cutting teeth without any base portion beneath the cutting teeth. Alternatively, each strip 122 may include a fewer (e.g., one) or a greater (e.g., three or four) number of full cutting teeth 126.

Figure 7:
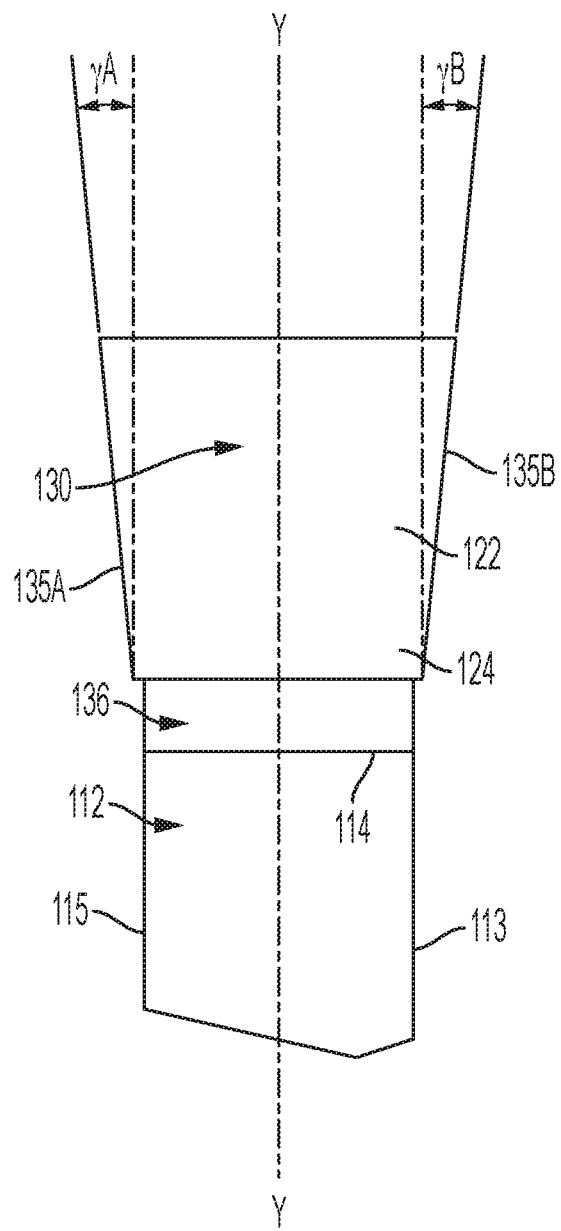
FIG. 7 is a is a cross-sectional view of the saw blade of FIG. 6 along line B-B prior to setting the teeth.

Each full cutting tooth 126A, 126B includes a rake face 130 extending upward from the base portion 124 to a cutting tip 132, and a relief face 134 extending downward from the cutting tip 130 toward the base portion 128. Each rake face 130 is disposed at a rake angle α (e.g., approximately −10° to 10°) relative to a vertical axis Y that is perpendicular to the longitudinal axis X. Each relief face 134 is disposed at a relief angle β (e.g., approximately 5° to 45°) relative to the vertical axis Y. Each cutting tooth 126 also has a left side face 135A and a right side face 135B extending from the rake face 130 to the relief face 134. As shown in FIG. 7, prior to setting, the side faces 135A, 135B may be disposed at left angles γA (e.g. approximately 0° to 10°) and right angles γB (e.g., approximately 0° to 10°) relative to the side faces of the body 114 and relative to the vertical axis Y so that the tooth is formed with a trapezoidal cross-sectional shape. The left and right angles γA and γB may be the same or different than one another. Alternatively, the side faces 135A, 135B may be disposed parallel to the vertical axis Y, so that the tooth is formed with a rectangular cross-sectional shape.

Each hard metal strip 122 is attached to the cutting edge 114 of the body 112, e.g., by welding, brazing, soldering, or adhesive. In an illustrated embodiment, the base portion 124 of each hard metal strip 122 may be welded to the cutting edge 114 via a more ductile weld fusion zone 136. Each weld fusion zone 136 may be composed of an alloying material that results in a more ductile welded joint. For example, an alloying material such as nickel or a nickel alloy may be sandwiched between the strip 122 and blade body 112 or fed into the weld zone between the strip 122 and the blade body 112.

Figure 8:
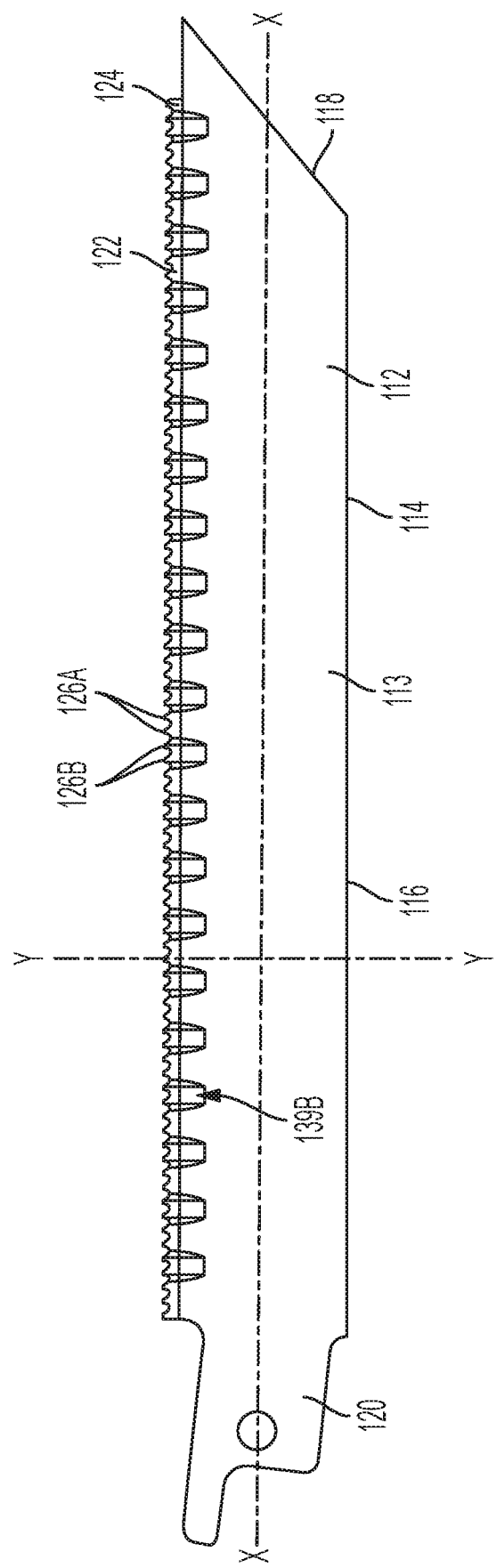
FIG. 8 is a side view of the saw blade of FIG. 6 after setting the teeth.
Figure 9:
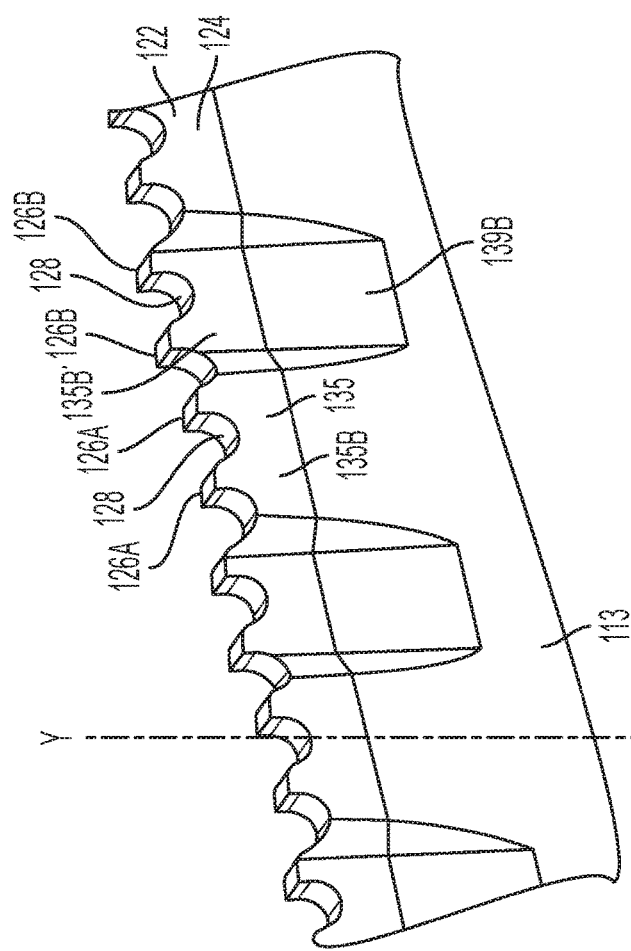
FIG. 9 is a close-up perspective view of a portion of the saw blade of FIG. 6 after setting the teeth.
Figure 10:
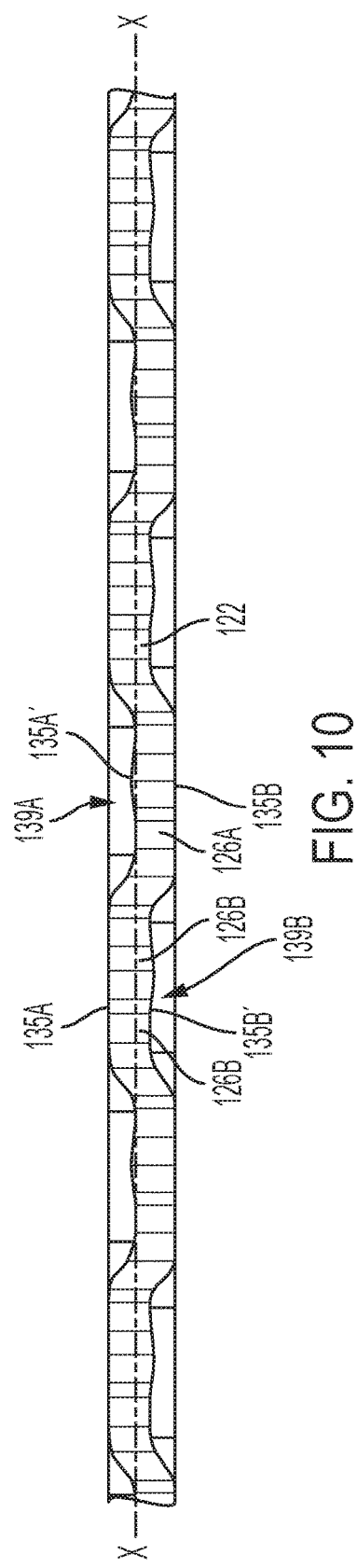
FIG. 10 is a top view of a portion of the saw blade of FIG. 6 after setting the teeth.
Figure 11:
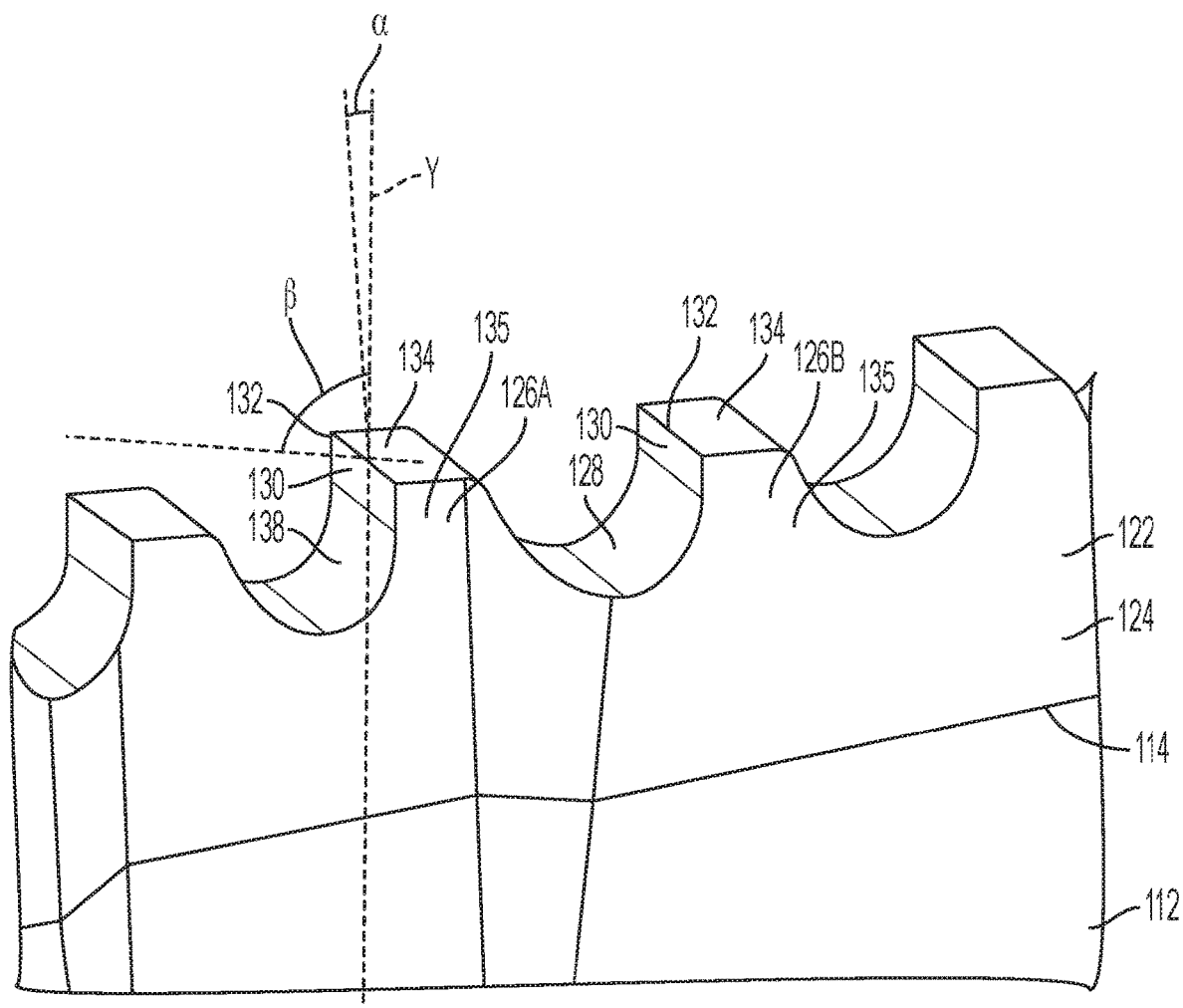
FIG. 11 is another close-up perspective view of a portion of the saw blade of FIG. 6 after setting the teeth.

Because they are made of a hard metal, the teeth 126 on the strips 122 cannot be set left or right in the traditional manner by bending the teeth because this would require a great deal of force and risk fracturing the strips 122. Instead, as shown in FIGS. 8-10, in an embodiment, the left side faces 135A of a one or more of the teeth 126A may be ground or otherwise formed or shaped (either before or after being attached to the body 112) so that a portion of left side face 135A is removed to create a left side recess 139A and a new left side face 135A' that is recessed from a left side face 115 of the body 112. In the illustrated embodiment, the left side recess 139A may extend at least partially into or through one or more of the base portion 124 of the strip 122, the weld fusion zone 136, and the left side face 115 of the body 112. In the embodiment shown in FIGS. 9-11, the new left side face 135A' is generally parallel to the vertical axis.

Similarly, the right side faces 135B of a one or more of the teeth 126B may be ground or otherwise formed or shaped (either before or after being attached to the body 112) so that a portion of left side face 135B is removed to create a right side recess 139B and a new left side face 135B' that is recessed from a right side face 113 of the body 112. In the illustrated embodiment, if this forming operation is performed after attaching the strip 122 to the body, the right side recess 139A may extend at least partially into or through one or more of the base portion 124 of the strip 122, the weld fusion zone 136, and the right side face 113 of the body 112. In the embodiment shown in FIGS. 9-11, the new right side face 135B' is generally parallel to the vertical axis.

Forming the recesses 139A, 139B in an alternating pattern of the side surfaces 135, 137 of the teeth 126A, 126B makes the teeth function as though they are set in an alternating left and right pattern. In the illustrated embodiment, with fine pitch teeth, it may be more expedient to form each recess 139A, 139B across two teeth 124A, 126B, so that the teeth are then set in a L-L-R-R- pattern. Alternatively, a third tooth or set of teeth in each sequence may not be formed to have a recess or may be formed with a recess on both side faces of the tooth, such that these third teeth are unset or raker teeth. In that embodiment, the teeth could be set in a L-L-R-R-U- pattern or a L-L-R-R-U- pattern. Other set patterns may be used, such as L-R-L-R, L-R-L-R, U, and light left-light right-heavy left-heavy right- or unset-left-right-left-right-. In each embodiment, the set angles of the left set teeth and the right set teeth, and the angles of the side faces of the left and right set teeth, may be the same or may be different than one another.

Figure 12:
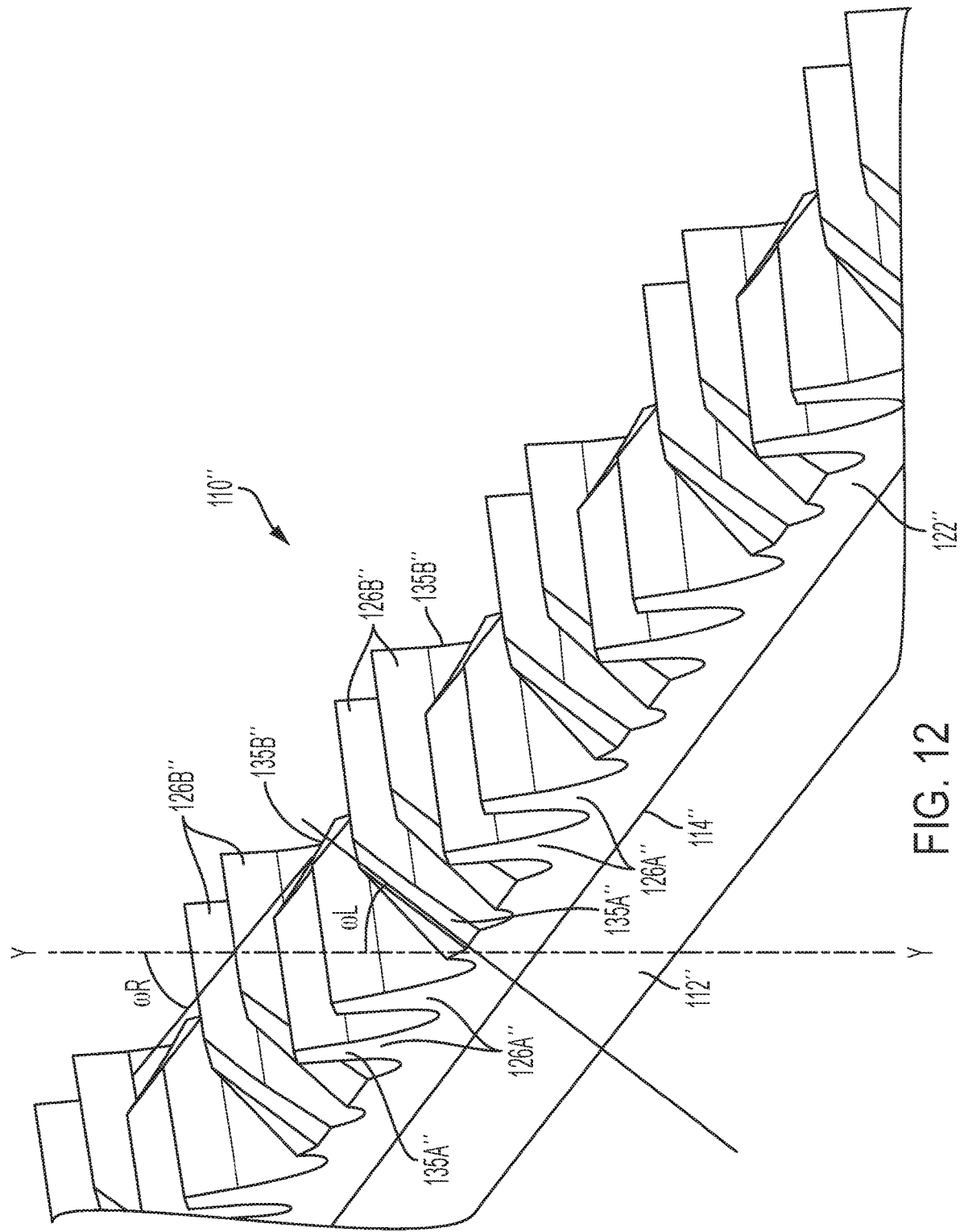
FIG. 12 is a close-up perspective view of a portion of another embodiment of a saw blade.

Referring to FIG. 12, in another embodiment, a saw blade 110", similar to saw blade 110 (e.g., a reciprocating saw blade), includes an elongated body 112", an elongated cutting edge 114", and one or more hard metal cutting strips 122" attached to the cutting edge 114" and configured to perform cutting of a workpiece. Each cutting strip 122" includes a plurality of left set teeth 126A" and a plurality of right set teeth 126B" in an alternating set pattern. The left set teeth 126A" each have a left side face 135A" that is parallel to the vertical axis Y and a right side face 135B" that has been ground or otherwise formed or shaped (either before or after being attached to the body 112") to be disposed at a non-zero angle ωR (e.g., approximately 5° to 45°) to the vertical axis Y. The right set teeth 126B" each have a right side face 135B" that is parallel to the vertical axis Y and a left side face 135A" that has been ground or otherwise formed or shaped (either before or after being attached to the body 112) so that the left side face 135A" is disposed at a non-zero left angle ωL (e.g., approximately 5° to 45°) to the vertical axis Y. For example, as shown in FIG. 12, a saw blade 110" may have a carbide strip 122" with left set teeth 126A" and right set teeth 126B" with right side faces 135B" and left side faces 135A" disposed at angles ωR and ωL of approximately 45° relative to the vertical axis Y, respectively.

Figure 13A:
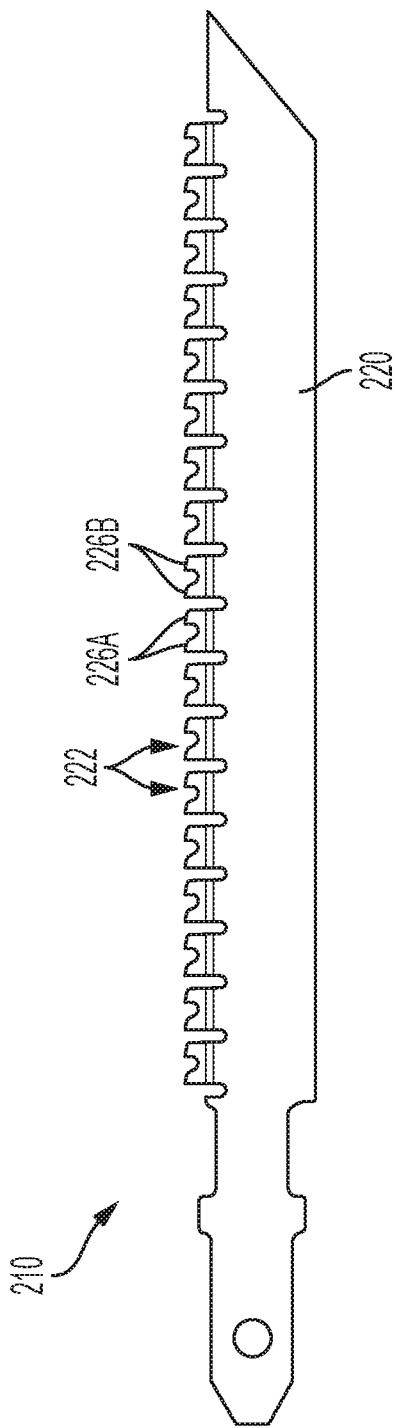
FIGS. 13A and 13B are side views of other embodiments of jigsaw blades.
Figure 13B:
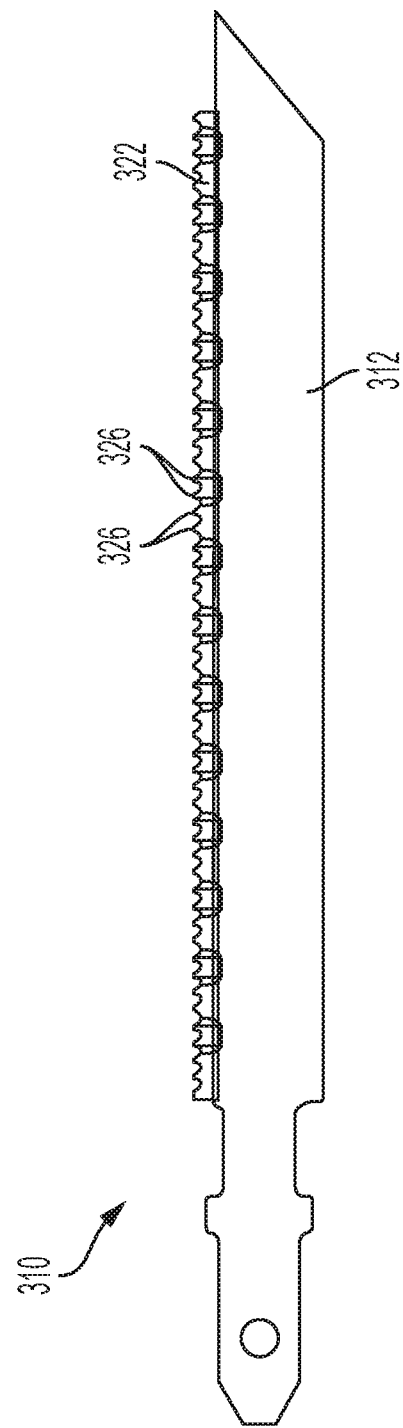
Figure 14:
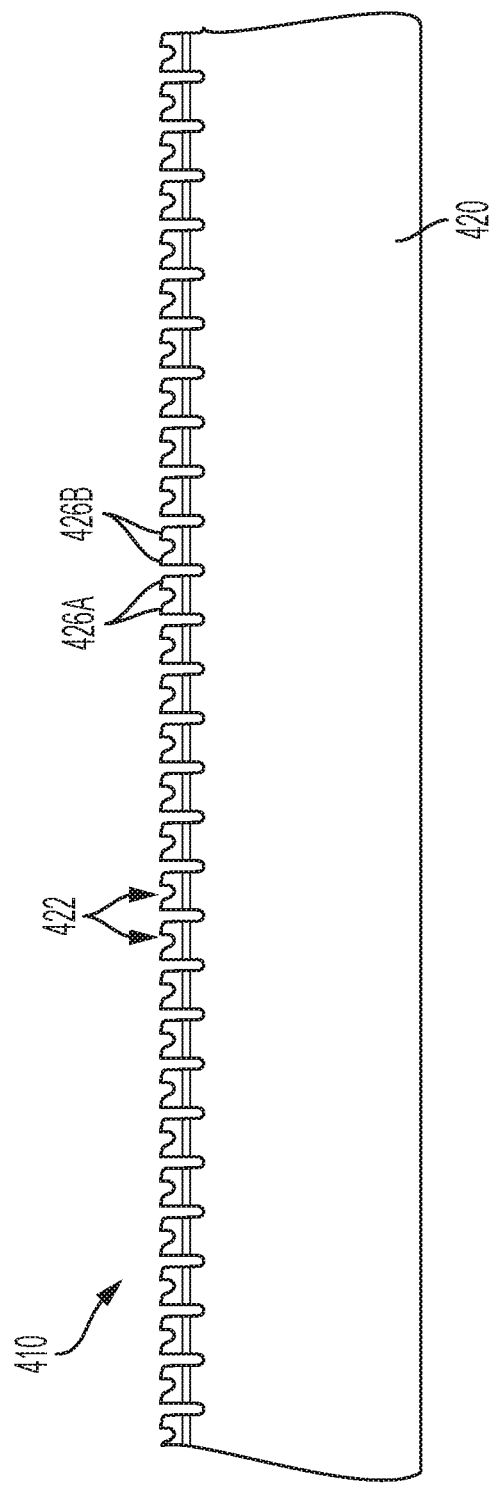
FIG. 14 is a side view of another embodiment of a bandsaw blade.
Figure 15A:
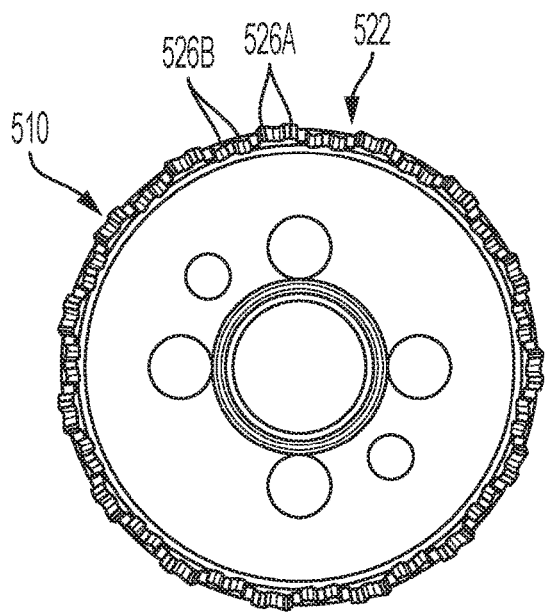
FIGS. 15A-15C are top, side, and perspective views of another embodiment of a holesaw blade.
Figure 15C:
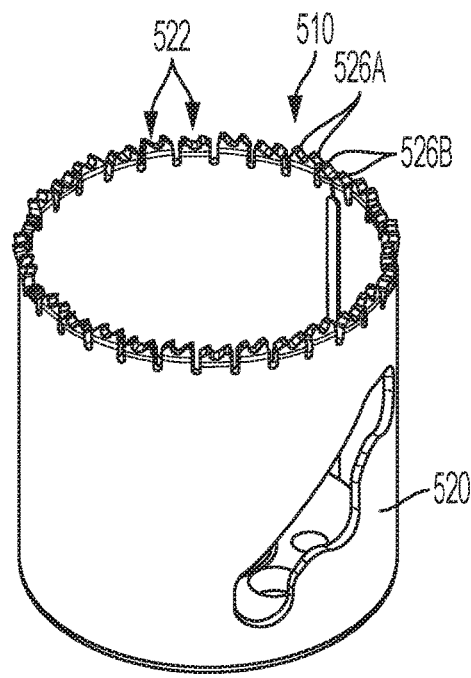
Figure 15B:
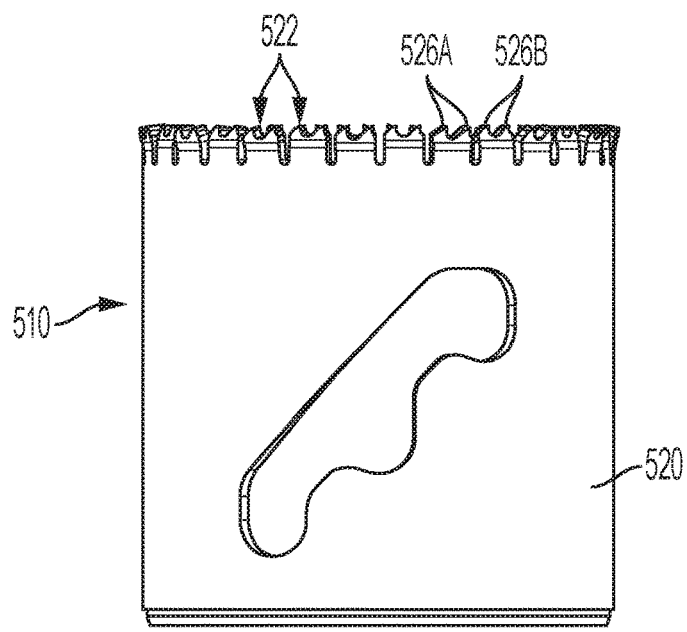

The above-described embodiments are not limited for use in reciprocating saw blades. Rather they can be used in any number of different types of saw blades, such as, for example, jigsaw blades, bandsaw blades, and holesaws. For example, FIG. 13A illustrates a jigsaw blade 210 with a plurality of hard metal cutting strips 222 attached to a blade body 220, each having cutting teeth 226A, 226B that have been ground on their left and right sides and/or set by bending at the ductile weld zone, similar to the hard metal cutting strips 22 described above with respect to FIGS. 1-5. FIG. 13B illustrates another embodiment of a jigsaw blade 310 having one or more hard metal cutting strips 322 attached to a blade body 312 and having teeth 326 that have portions of their left and right side faces removed, similar to the hard metal cutting strip 122 described above with respect to FIGS. 6-11. FIG. 14 illustrates a portion of a bandsaw blade 410 with a plurality of hard metal cutting strips 422 attached to a blade body 420, each having cutting teeth 426A, 426B that have been ground on their left and right sides and/or set by bending at the ductile weld zone, similar to the hard metal cutting strips 22 described above with respect to FIGS. 1-5. FIGS. 15A-15C illustrate a holesaw 510 with a plurality of hard metal cutting strips 522 attached to a cylindrical blade body 520, each having cutting teeth 526A, 526B that have been ground on their inner and outer sides and/or set by bending at the ductile weld zone, similar to the hard metal cutting strips 22 described above with respect to FIGS. 1-5 to set these teeth toward an inner or outer side of the holesaw.

FIG. 16A-17B illustrate an oscillating blade 610 having a shank portion 612 with a rear end portion 614 and a front end portion 616 and a cutting portion 618 with a rear end portion 620 attached to the front end portion 616 of the shank portion 612 and a front portion 622. The rear end portion 614 of the shank portion 612 is generally planar and includes a plurality of openings 624 configured to couple the oscillating blade 610 to one or more oscillating power tools. For example, the openings may have one of the configurations disclosed in U.S. Pat. No. 9,242,361, which is incorporated by reference, to couple the blade 610 to multiple different brands of oscillating power tools. The front end portion 616 of the shank portion 612 is generally planar and is coupled to the rear end portion 614 of the shank portion 612 by an angled portion 615 so that the front end portion 616 and rear end portion 614 of the shank portion lie in offset planes.

The cutting portion 618 includes one or more hard metal cutting strips 630 attached to the front cutting portion 622. The hard metal cutting strip(s) 630 having teeth 632 with portions of their top and bottom faces 634, 636 removed, similar to the hard metal cutting strip 122 described above with respect to FIGS. 6-11. Each hard metal cutting strip 630 includes a base portion 638 and a plurality of full cutting teeth 632A, 632B that are integral with the base portion 638. In the illustrated embodiment, each hard metal cutting strip 630 comprises at least two cutting teeth 632A to be set toward the bottom of the blade 610, at least two cutting teeth 632B to be set toward the top of the blade 610, and intermediate gullets 640 disposed between adjacent teeth 632A, 632B. In each pair of teeth 632A, 632B, a portion 642 of the carbide strip 630 and a portion 644 of the cutting portion 618 of the blade 610 are removed (e.g., by grinding or machining) to form a recess 646 that effectively sets the tooth toward the top or bottom of the blade 610. The recess 646 may be parallel or angled relative to top and bottom faces of the cutting portion 618. At least one of the teeth may be free of any recess so that it is unset.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A saw blade comprising:
   a body having a cutting edge, a first side face, and a second side face; and
   a hard metal strip having a base portion affixed to the cutting edge, at least one first full hard metal cutting tooth attached to the base portion, and at least one second full hard metal cutting tooth attached to the base portion, each cutting tooth having a first side surface and a second side surface,
   wherein the first side surface of each first cutting tooth is recessed relative to and generally parallel to the first side face of the body, such that each first cutting tooth is set toward the second side face of the body,
   wherein the second side surface of each second cutting tooth is recessed relative to the second side face of the body, such that each second cutting tooth is set toward the first side face of the body, and
   wherein the hard metal strip comprises carbide or cermet.

2. The saw blade of claim 1, wherein each first recessed side surface extends into the first side face of the body.

3. The saw blade of claim 2, wherein each second recessed side surface extends into the second side face of the body.

4. The saw blade of claim 1, wherein the second side surface of each second cutting tooth is generally parallel to the second side face of the body.

5. The saw blade of claim 4, wherein the second side surface of each first cutting tooth extends at an angle relative to the second side face of the body.

6. The saw blade of claim 5, wherein the first side surface of each second cutting tooth extends at an angle relative to the first side face of the body.

7. The saw blade of claim 1, wherein the hard metal strip further comprises at least one third hard metal tooth attached to the base portion and being free of any recess, such that the third hard metal tooth is unset.

8. The saw blade of claim 7, wherein a first side surface of each third cutting tooth extends at an angle to the first side face of the body and a second side surface of each third cutting tooth extends at an angle to the second side face of the body.

9. The saw blade of claim 1, wherein each first recessed side surface is formed by grinding the first side surface of each first tooth after the hard metal strip has been attached to the body.

10. The saw blade of claim 9, wherein each second recessed side surface is formed by grinding the second side surface of each second tooth after the hard metal strip has been attached to the body.

11. The saw blade of claim 1, wherein the saw blade is a reciprocating saw blade, a jigsaw blade, or a bandsaw blade, the first cutting tooth is set toward a left side of the body, and the second cutting tooth is set toward a right side of the body.

12. The saw blade of claim 1, wherein the saw blade is an oscillating blade, the first cutting tooth is set toward a top side of the body, and the second cutting tooth is set toward a bottom side of the body.

13. The saw blade of claim 1, wherein the saw blade is a holesaw, the first cutting tooth is set toward an inner side of the body, and the second cutting tooth is set toward an outer side of the body.

14. The saw blade of claim 1, wherein the hard metal strip comprises a first hard metal strip that includes the first cutting tooth and a second hard metal strip that includes the second cutting tooth.

15. A saw blade comprising:
   a body having a first side face, a second side face, and a cutting edge;
   a first hard metal strip attached to a first portion of the cutting edge and including at least one first full hard metal cutting tooth that is set toward the first side face; and
   a second hard metal strip attached to a second portion of the cutting edge and including at least one second full hard metal cutting tooth that is set toward the second side face,
   wherein a first side surface of each first cutting tooth is recessed relative to and generally parallel to the second side face of the body, such that each first cutting tooth is set toward the first side face of the body, and
   wherein a second side surface of each second cutting tooth is recessed relative to the first side face of the body, such that each second cutting tooth is set toward the second side face of the body.

16. The saw blade of claim 1, wherein the second side surface of each first cutting tooth is generally coplanar with the second side face of the body.

17. The saw blade of claim 16, wherein the first side surface of each second cutting tooth is generally coplanar with the first side face of the body.

18. The saw blade of claim 15, wherein the first hard metal strip comprises a base coupled to the first portion of the cutting edge and the at least one first hard metal cutting tooth comprises at least two consecutive first full hard metal cutting teeth each set toward the first side face.

19. The saw blade of claim 18, wherein the second hard metal strip comprises a base coupled to the second portion of the cutting edge and the at least one second hard metal cutting tooth comprises at least two consecutive second full hard metal cutting teeth each set toward the second side face.

20. The saw blade of claim 15, wherein a second side surface of the first tooth is formed to be angled relative to the first side face of the body and a first side surface of the second tooth is formed to be angled relative to the second side face of the body.

21. The saw blade of claim 15, further comprising a third hard metal strip affixed to a third portion of the cutting edge and including at least one third full hard metal cutting tooth that is unset.

22. The saw blade of claim 15, wherein each of the first hard metal strip and the second hard metal strip comprises carbide or cermet.

\* \* \* \* \*